Feb. 8, 1944.     W. M. VENABLE     2,341,249
FLUID DOSING DEVICE
Filed July 29, 1941     2 Sheets-Sheet 1
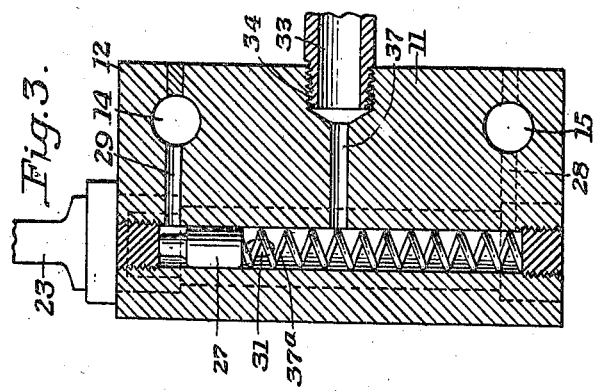
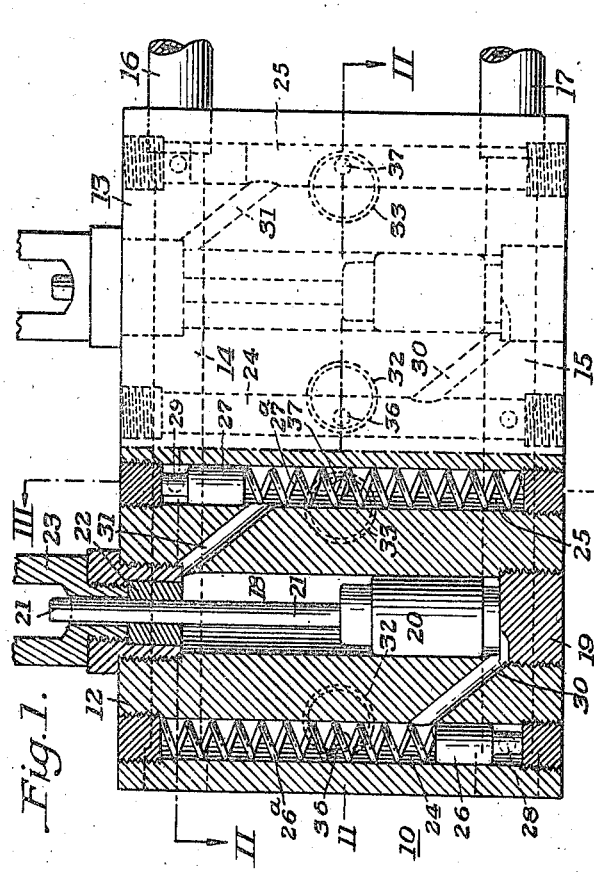
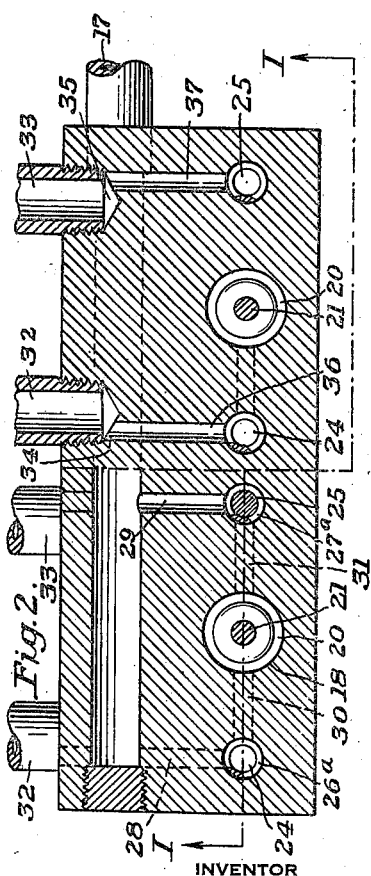
INVENTOR
William M. Venable
by his attorneys
Stebbins and Blenko

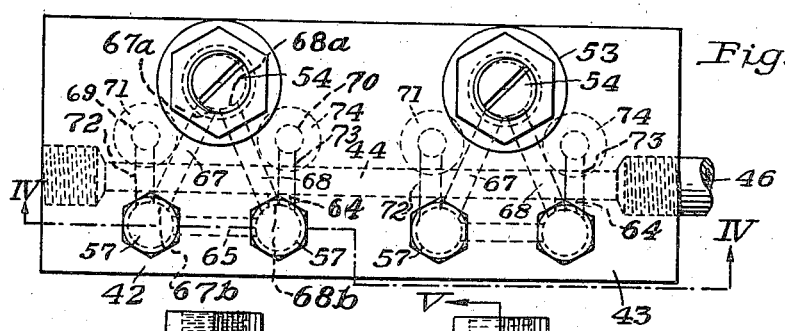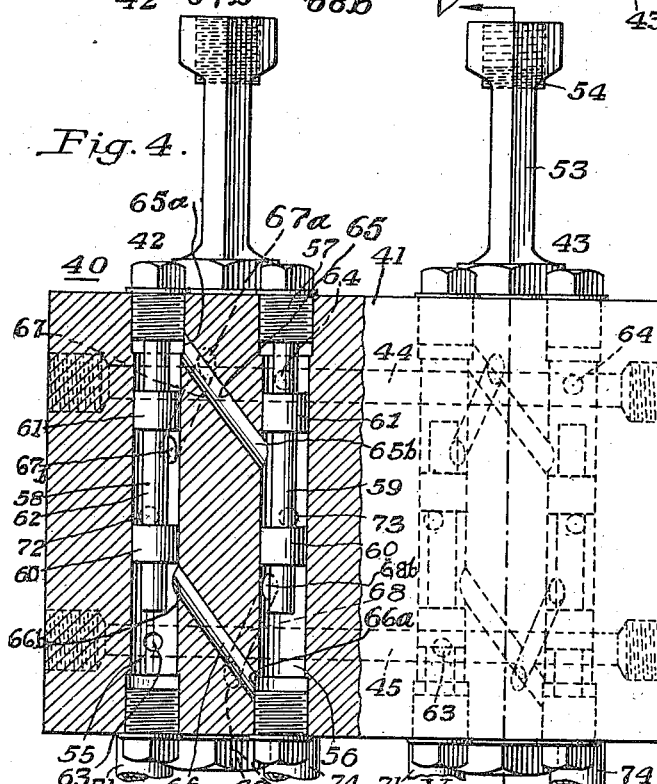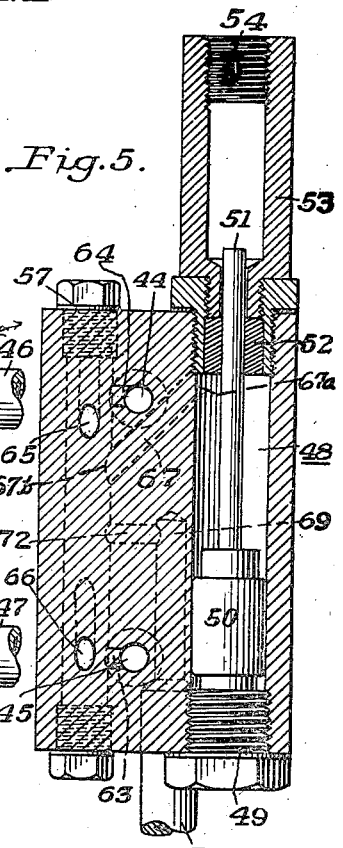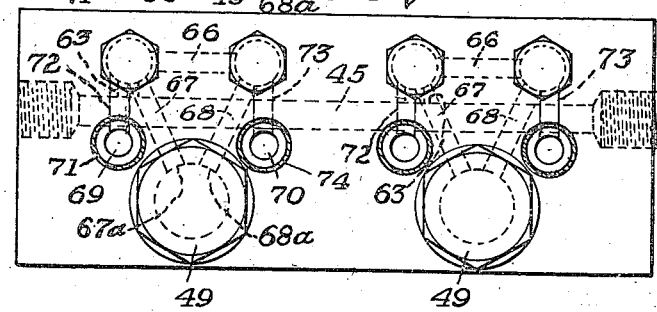

Patented Feb. 8, 1944

2,341,249

UNITED STATES PATENT OFFICE 2,341,249

FLUID DOSING DEVICE

William Mayo Venable, Pittsburgh, Pa., assignor to Blaw-Knox Company, Pittsburgh, Pa., a corporation of New Jersey Application July 29, 1941, Serial No. 404,476

5 Claims. (Cl. 184—7)

This invention relates to devices for delivering measured quantities of fluid material when pressure is applied to a source of the material connected by a pipe line to the delivery device.

Fluid dosing devices of this general type have been known heretofore and it is the object of this invention to improve generally thereupon, particularly dosing devices having two fluid-supply lines connected thereto. The invention provides a dosing device in which the outlet at one end of a measuring cylinder or bore is positively opened before the inlet at the other end of the bore is opened. A further object of the invention is to provide a dosing device which can be made at low cost by simple machining operations, which is relatively leak-proof, and can be readily constructed in multiple, whereby any desired number of dosing devices may be provided in a single block.

The principal application of the invention is in the distribution of lubricant such as grease, to a plurality of bearings although there are other applications such as the packaging of various fluid materials in which the delivery of a measured amount of fluid is involved.

In a preferred embodiment of the invention, I employ a metal block of appropriate size, and bore it to form a measuring cylinder and separate, parallel valve cylinders with the necessary inter-connecting passages, inlets adapted to be connected to the source of the material to be delivered, and outlets connected to the points at which the material is to be delivered. In one form of the invention, I rely on compression springs to actuate control valves in one direction. In the preferred form, the control valves are operated in both directions by fluid pressure. Further details and novel features of the invention will become apparent during the following complete description and explanation which refer to the accompanying drawings illustrating two embodiments. In the drawings, Figure 1 is a view partly in horizontal section and partly in plan of one embodiment;

Figure 2 is a transverse sectional view taken along the line of II—II of Figure 1; line I—I of Figure 2 indicates the plane on which the section shown in Figure 1 is taken;

Figure 3 is a transverse sectional view taken along the plane of III—III of Figure 1;

Figure 4 is a view similar to Figure 1 showing the preferred embodiment;

Figure 5 is a transverse sectional view taken substantially along the line V—V of Figure 4;

Figure 6 is a plan view; line IV—IV of Figure 6 indicates the plane on which the section shown in Figure 4 is taken; and Figure 7 is a bottom plan view.

Referring now in detail to the drawings and, for the present, to Figures 1 through 3 particularly, the dosing device indicated generally at 10 comprises a metal block 11 in which are incorporated a plurality of identical dosing devices 12, 13. The block 11 may be designed to accommodate any desired number of dosing devices by making it of appropriate length. Since the several dosing devices are identical, regardless of the number, only one will be described in detail. Longitudinal inlet passages 14 and 15 are bored through the block 11 and are tapped at one end to receive inlet pipes 16 and 17. The other ends of the inlet passages are plugged. The passages 14 and 15 serve to supply fluid to both the dosing devices 12 and 13.

A transverse bore 18 through the block 11 provides a dosing or measuring cylinder and one end of the bore is closed by plug 19. A floating piston 20 having an indicating stem 21 is reciprocable in the cylinder 18, the stem 21 extending out through a packing gland 22 at the other end of the bore. A cage 23 partially surrounds the stem 21 and prevents interference with or injury to the stem when extended.

Additional transverse bores 24 and 25 provide piston-valve cylinders adjacent the cylinder 18. The ends of these bores are plugged and valve pistons 26 and 27 are reciprocable therein. The pistons 26 and 27 are normally urged toward one end of their cylinders by coil springs 26a and 27a. A connecting passage 28 intersects the inlet passage 15 and the valve cylinder 24. A similar passage 29 intersects the inlet passage 16 and the valve cylinder 25. The cylinders, pistons and ports comprise two separate valves whereby the flow of lubricant is directed to and from the measuring cylinder in dispensing a dose in the manner subsequently to be described.

A connecting passage 30 intersects the cylinder 18 adjacent one end and the cylinder 24 at a point spaced from the corresponding end thereof by a distance slightly greater than the length of the piston 26. A passage 31 similarly intersects the cylinder 18 and the cylinder 25 adjacent the other ends thereof. Outlet connections 32 and 33 are threaded into tapped holes 34 and 35 in one face of the block 11. As shown in Figures 2 and 3 the tapped holes 34 and 35 for the outlet pipes 32 and 33 are distributed along one face of the block 11, substantially in the longitudinal central plane thereof. Passages 36 and 37 connect these outlets with valve cylinders 24 and 25 respectively. Passages 36 and 37 may be drilled from the same face of the block as holes 34 and 35, as shown in the right-hand portion of Figure 2.

The operation of the structure described above will now be explained, assuming that the several bores and passages mentioned are filled with the grease or other fluid to be delivered. The outlet or delivery connections 32 and 33 may extend to separate bearings or may be connected together to supply a single bearing, in case the device is applied to a lubricating system. With the parts in their illustrated positions, the connection of the inlet 17 to the source of fluid under pressure and the opening of inlet pipe 16 to relief, if it be under pressure, by operation of a suitable control valve or the like (not shown), permits fluid to flow through the inlet passages 15 and the connecting passages 28 into the valve cylinder 24. The pressure applied to the fluid causes the valve piston 26 to be displaced and the spring 26a compressed, until it passes the intersection of the passage 30 with the cylinder 24. Movement of the piston 26 against the pressure exerted by spring 26a displaces a small amount of fluid in cylinder 24, which is discharged through passage 36 into connection 32.

When the valve piston 26 has moved sufficiently to open passage 30, grease flows through the latter into the cylinder 18 between the piston 20 and plug 19. The piston 20 is thereby displaced and discharges the grease between the piston and the packing gland 22 through the passage 31, the piston-valve cylinder 25, the connecting passage 37, and the outlet 33 to the bearing or other point of delivery. It will be understood, of course, that all the dosing devices of a single unit such as that shown in Figures 1 through 3 operate simultaneously and discharge measured quantities of fluid to the various points of delivery to which they are connected.

When the piston 20 reaches the end of its stroke, no further discharge of fluid takes place. The pressure must be released in the supply line 17 before any further action within the dosing device can occur. Upon release of the pressure, the spring 26a moves the piston 26 back to the position shown in Figure 1, thereby forcing a small amount of fluid through passage 28 into supply line 17 and sucking back into cylinders 24 through passage 36 the same amount of fluid that was forced therethrough when piston 26 moved in the opposite direction. The piston 20 is then at the opposite end of cylinder 18 from where it is shown in Figure 1, but both valve pistons 26 and 27 are in the same position as there shown.

When it is next desired to deliver a charge of fluid, pressure is applied to the material in inlet line 16 whereupon the piston valve 27 is displaced, forcing a small amount of fluid through passage 37 and to outlet 33. When the valve piston 27 opens the passage 31, however, fluid is admitted to the upper end of cylinder 18 to discharge the dose previously delivered to the other end of the cylinder. As in the previous operation, the movement of the piston 20 discharges a measured amount of fluid through the passage 30, the cylinder 24, the passage 36 and the outlet 32.

It will be apparent that if the outlets 32 and 33 of a single dosing device are connected to the same bearing or other point of discharge, a dose will be delivered thereto on every operation of the device. If the outlets are connected to different points of discharge, they will receive fluid only on alternate operations of the device.

Figures 4 through 7 illustrate the preferred embodiment of the invention, indicated generally at 40. In this embodiment, springs are not employed and fluid pressure serves to operate the control valves in both directions. The device 40 comprises a block 41 incorporating a plurality of separate identical dosing devices 42 and 43. Longitudinal inlet passages or manifolds 44 and 45 supply fluid to the several dosing devices, being tapped to receive pipe lines 46 and 47 at one end and closed by plugs at the other. Each of the dosing devices includes a transverse bore through the block 41 providing a measuring cylinder 48. One end of the cylinder 48 is closed by a screw plug 49. A floating piston 50 is reciprocable in the cylinder 48 and has an indicating stem 51 extending through a packing gland 52. A cage 53 protects the stem 51 when extended and a screw plug 54 adjustable therein determines the extent of movement of the piston 50.

Each dosing device includes also two valves for directing lubricant to and from the dosing cylinder. The block 41 has transverse bores therethrough providing valve cylinders 55 and 56. The ends of these bores are closed by screw plugs 57 and valve pistons 58 and 59 are reciprocable therein. Each valve piston includes a pair of heads 60, 61 and a stem 62. These parts may be integral or the valve piston may be made in two parts each including one head and a portion of the stem.

In Figure 4, the valve pistons of the device 42 are shown at one end of their stroke and the valve pistons of the device 43 at the other end. This is merely for illustration since the valve pistons of all units move simultaneously and occupy corresponding positions at all times. The showing of Figure 4, however, is believed to be clearer for the purpose of explanation than if it were attempted to show alternate positions in dotted lines.

A connecting passage 63 intersects the valve cylinder 55 adjacent one end thereof and the passage 45. A similar passage 64 intersects the valve cylinder 56 and the passage 44. A connecting passage 65 intersects the valve cylinder 55 at inlet 65a adjacent one end and the valve cylinder 56 at a port 65b so spaced from the end thereof as to lie between the heads 60 and 61 when the valve 59 is in its extreme position as shown in Figure 4. A similar connecting passage 66 intersects the valve cylinder 56 at inlet 66a and cylinder 55 at port 66b.

A connecting passage 67 intersects the cylinder 48 adjacent one end thereof at 67a and the valve cylinder 55 at opening 67b which lies between the heads 60 and 61 when the valve piston is in its upper position. A similar connecting passage 68 connects the other end of cylinder 48 at 68a with the valve cylinder 56 at 68b. Outlet passages 69 and 70 are drilled into the block 41 from one side and are tapped to receive connections 71 and 74 leading to the point where the material is to be delivered. Cross-passages 72 and 73 intersect the outlet passages 69 and 70 adjacent their inner ends and the valve cylinders 55 and 56 adjacent the mid-point thereof.

The operation of the preferred embodiment will now be described assuming as before that all the passages are full of a fluid such as grease and that the piston 50 and the valve pistons 58 and 59 of all the dosing devices are in their extreme positions on the same side of the block, as shown for piston 50 in Figure 5 and the valve pistons indicated in dotted lines in Figure 4. Under these conditions, the application of pressure to the contents of the inlet pipe 47 in excess of any residual pressure in inlet pipe 46 causes fluid to flow through the passage 45 and the passage 63 into the valve cylinder 55. While the description of the operation is directed to a single device, it will be understood to apply to all the devices since they operate simultaneously.

Valve piston 58 is displaced by the fluid entering the lower end of the cylinder 55 and is moved to the position shown in full lines in Figure 4. Movement of piston head 60 by grease pressure causes movement of piston head 61 past the opening 67b of passage 67 thus establishing an outlet from cylinder 48 at the end opposite the initial position of the piston 50. The movement of head 61 also forces a small amount of grease from cylinder 55 through passage 65 to the other valve cylinder 56, where the pressure is relieved through the passage 64. After the movement of head 60 so as to make connection between passages 63 and 66, fluid is free to flow through the connecting passage 66 into the valve cylinder 56. This causes the other valve piston 59 to be similarly displaced to the position shown in full lines in Figure 4. This opens the inlet 68b of passage 68 whereupon fluid flows therethrough into the cylinder 48 entering at 68a between the piston 50 and plug 49. The piston 50 is thereupon displaced.

The fluid between the piston 50 and the packing gland 52 is forced out through 67a and connecting passage 67 into valve cylinder 55 at 67b between the heads 60 and 61 of the valve piston 58. From this space the fluid flows through the connecting passage 72 to the outlet 69 and pipe 71.

On the completion of the operation described above, the valve pistons and measuring pistons of all the dosing devices are at the opposite ends of their respective cylinders from those described in the foregoing explanation of the operation. The release of pressure in pipe 47 and the application of pressure in pipe 46 results in reversal of the valves, and in the delivery of a dose through 70 instead of through 69. This is obvious because of the nature of the symmetry of the arrangement as already described. The invention is characterized by numerous advantages. The opening of the discharge outlet from the dosing cylinder is always accomplished before presure is applied to the dosing cylinder. This insures ease in operation. Leakage, furthermore, is kept at a minimum. There is no sucking back of lubricant upon reversal of the valves, in the preferred form of the invention, and the construction of the moving parts is very simple. All of these advantages are present in a unit comprising a single dosing device for one or two bearings only.

In lubricating systems where there are many bearings, sometimes several hundred, to be lubricated at a single operation, however, it is desirable to reduce the number of units, and therefore to combine a number of dosing devices in a single unit for such applications, the device, the operation of which has just been described, is especially suitable.

The construction of both forms of the device of my invention is such that they may be manufactured at relatively low cost. The various cylinders and connecting passages may easily be formed by drilling from the exterior faces of a solid block. Most of the passages, furthermore, are parallel to the faces of the blocks, further simplifying the machining operations. Incidentally, in the drawings some of the passages which are drilled from the exterior of the block are not shown in full but only the active portion thereof, to avoid confusion. It will be understood, of course, that the outer ends of such passages are plugged or otherwise suitably closed.

Although I have illustrated and described herein but a preferred embodiment and modification of the invention, it will be recognized that changes in the details of the construction disclosed may be made without departing from the spirit of the invention or the scope of the appended claims.

I claim:

1. A fluid dosing device comprising a dosing cylinder having a piston freely reciprocable therein, a pair of similar valve cylinders each having an inlet connection adjacent one end thereof for admitting fluid under pressure from one of two pressure supply lines, and a discharge opening intermediate the ends thereof for the discharge of fluid to a point of application, and each valve cylinder also having connection between one end of the dosing cylinder and a point in the valve cylinder spaced from the discharge opening toward the end of the valve cylinder which is opposite the inlet connection, two cross connections between the two valve cylinders, each cross connection extending from a point intermediate the inlet connection and discharge opening of one valve cylinder to the end of the other valve cylinder which is opposite its inlet connection, and a piston in each valve cylinder freely reciprocable therein having a cut-away portion intermediate its ends of a length to connect the discharge opening with the connection to the dosing cylinder, whereby delivery of fluid under pressure to the inlet connection of one valve cylinder and release of pressure at the inlet connection of the other valve cylinder causes the piston in said one valve cylinder to move toward the end thereof opposite the inlet connection and thereby connect the dosing cylinder with a discharge outlet and also admit fluid under pressure to the end of said other valve cylinder opopsite the inlet connection thereof, whereupon the piston in said other valve cylinder then moves toward the inlet connection thereof and establishes communication between said other valve cylinder and the dosing cylinder, thereby admitting fluid under pressure to the latter so as to advance the piston therein and discharge fluid therefrom through said one valve cylinder to the point of fluid application.

2. A fluid dosing device comprising a dosing cylinder having a piston freely reciprocable therein, a pair of similar valve cylinders adjacent and parallel to the dosing cylinder, each having an inlet connection adjacent one end thereof for admitting fluid under pressure from one of two pressure supply lines, said inlet connections being at opposite ends of the valve cylinders, a discharge opening from each valve cylinder intermediate the ends thereof for the discharge of fluid to a point of application, and a connection from each valve cylinder at a point therein between the discharge opening and the end of the valve cylinder which is opposite its inlet connection to the end of the dosing cylinder which is adjacent said end of the valve cylinder, two cross connections between the two valve cylinders, each cross connection extending from a point intermediate the inlet connection and discharge opening of one valve cylinder to the adjacent end of the other valve cylinder, and a piston in each valve cylinder freely reciprocable therein having a cut-away portion intermediate its ends of a length to connect the discharge opening with the connection to the dosing cylinder, whereby delivery of fluid under pressure to the inlet connection of one valve cylinder and release of pressure at the inlet connection of the other valve cylinder causes the piston in said one valve cylinder to move toward the end thereof which is opposite the inlet connection and thereby connect the dosing cylinder with a discharge outlet and also admit fluid under pressure to the adjacent end of the other valve cylinder, whereupon the piston in said other valve cylinder then moves toward the inlet connection thereof and establishes communication between said other valve cylinder and the dosing cylinder, thereby admitting fluid under pressure to the latter so as to advance the piston therein and discharge fluid therefrom through said one valve cylinder to the point of fluid application.

3. A fluid dosing device comprising a dosing cylinder having a piston freely reciprocable therein, two supply lines from which fluid under pressure is supplied alternately by each line while the pressure in the other line is released, a pair of similar valve cylinders, each valve cylinder having a plurality of connections spaced along its length including an inlet connection from one of the supply lines, a connection to the end of the other valve cylinder which is opposite its inlet connection, an outlet connection to a point of fluid application, a connection to one end of the dosing cylinder, and a second connection to the other valve cylinder and at an intermediate point therein, and a valve piston in each cylinder adapted in one position to connect the inlet connection to the first connection to the other valve cylinder and to connect the connection from the end of the dosing cylinder to the outlet connection, and in its other position to connect the second connection from the other valve cylinder to the connection to the end of the dosing cylinder, said valves being subject to fluid pressure from a supply line first to connect one end of the dosing cylinder to the point of fluid application and thereafter to connect the other end of the dosing cylinder to the supply line which is under pressure.

4. A fluid dosing device comprising a dosing cylinder having a piston freely reciprocable therein, a pair of valve cylinders each having an inlet connection adjacent one end thereof and a discharge opening intermediate the ends thereof for the discharge of fluid to a point of application, a connection from one end of the dosing cylinder to a point intermediate the ends of one of the valve cylinders and spaced from the discharge opening thereof toward the end opposite that having the inlet connection and a connection from the other end of the dosing cylinder to a point intermediate the ends of the other valve cylinder and spaced from the discharge opening thereof toward the end opposite that having the inlet connection, two cross connections between the two valve cylinders, each cross connection extending from a point intermediate the inlet connection and discharge opening of one valve cylinder to the end of the other valve cylinder which is opposite its inlet connection, and a piston in each valve cylinder having spaced heads and a cut-away portion intermediate said heads, said cut-away portion being of a length to connect the discharge opening and the connection to the dosing cylinder, the distance between the discharge opening in each of the valve cylinders and the cross connection to said cylinder which extends from a point intermediate the inlet connection and discharge opening of each valve cylinder being greater than the length of the head nearest the inlet connection to each valve cylinder, said last-mentioned pistons being movable independently of each other under the pressure of fluid delivered to said inlet connections to establish communication between the dosing cylinder and one of the valve cylinders and thereby admit fluid to one end of the dosing cylinder to actuate the piston therein and discharge a dose from the other end of the dosing cylinder through the connection to the other valve cylinder and the discharge opening thereof.

5. Fluid distributing apparatus comprising a plurality of dosing devices disposed side-by-side, each device including a dosing cylinder having a piston freely reciprocable therein, a pair of valve cylinders adjacent the dosing cylinder and parallel thereto, an inlet connection adjacent one end of one of the valve cylinders and an inlet connection adjacent the opposite end of the other valve cylinder, a pair of spaced, parallel fluid-supply manifolds, one manifold communicating with the inlet connections of said one of the valve cylinders of the several devices and the other communicating with the inlet connections of the other valve cylinders of the several devices, whereby fluid pressure may be applied simultaneously to one valve cylinder of all the devices and then to the other valve cylinder of all the devices, a discharge opening intermediate the ends of each valve cylinder for the discharge of fluid to a point of application, a connection from one end of the dosing cylinder to a point intermediate the ends of one of the valve cylinders and spaced from the discharge opening thereof toward the end opposite that having the inlet connection, and a connection from the other end of the dosing cylinder to a point intermediate the ends of the other valve cylinder and spaced from the discharge opening thereof toward the end opposite that having the inlet connection, two cross connections between the two valve cylinders, each cross connection extending from a point intermediate the inlet connection and discharge opening of one valve cylinder to the end of the other valve cylinder which is opposite its inlet connection, and a piston in each valve cylinder having spaced heads and a cut-away portion intermediate said heads, said cut-away portion being of a length to connect the discharge opening with the connection to the dosing cylinder, the distance between the discharge opening in each of the valve cylinders and the cross connection to said cylinder which extends from a point intermediate the inlet connection and discharge opening of each valve cylinder being greater than the length of the head nearest the inlet connection to each valve cylinder, said last mentioned pistons being movable independently of each other under the pressure of fluid delivered to said inlet connections to establish communication between the dosing cylinder and one of the valve cylinders and thereby admit fluid to one end of the dosing cylinder to actuate the piston therein and discharge a dose from the other end of the dosing cylinder through the connection to the other valve cylinder and the discharge opening thereof.

WILLIAM MAYO VENABLE.